Jan. 21, 1969     W. D. WEAGANT     3,423,518
HEAT SHRINKABLE GROMMET
Filed Oct. 11, 1966
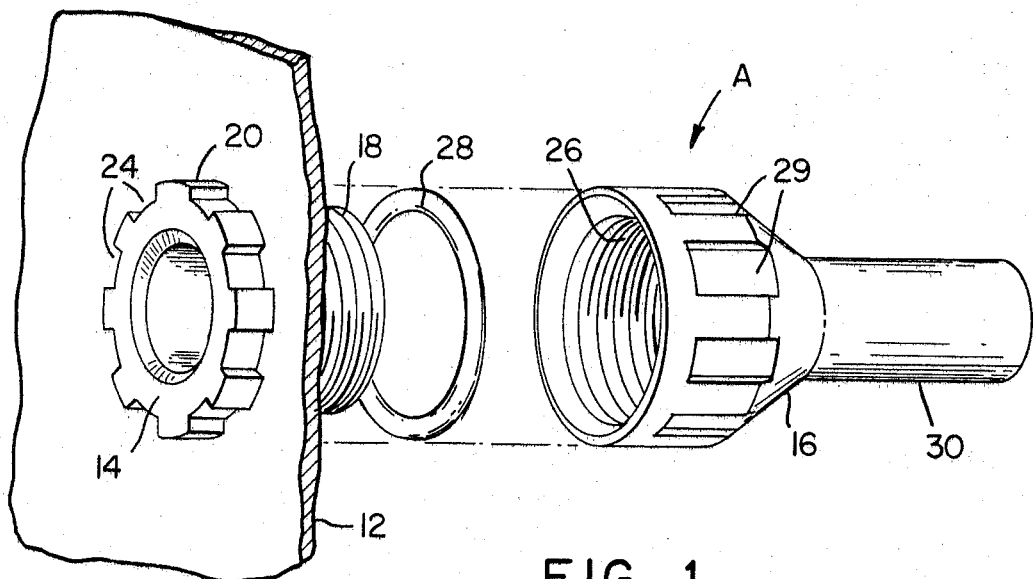
FIG_1
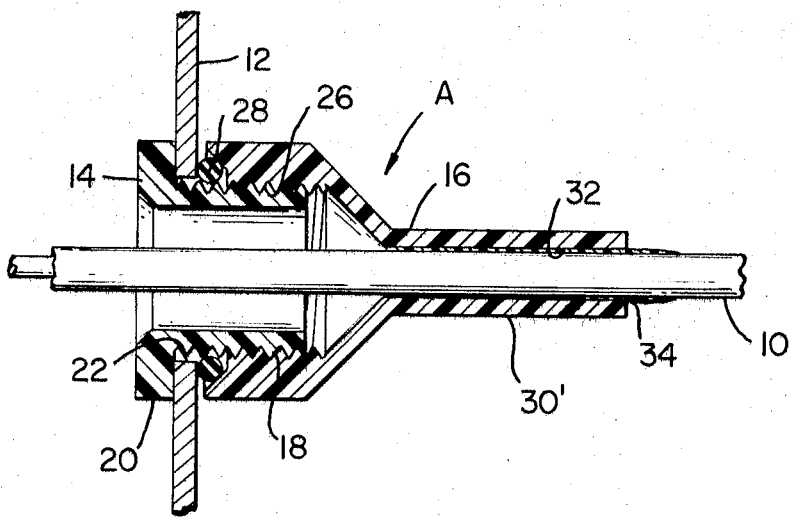
FIG_2
INVENTOR.
WILLIAM D. WEAGANT
BY
*Townsend & Townsend*
ATTORNEYS

3,423,518
HEAT SHRINKABLE GROMMET
William D. Weagant, Fremont, Calif., assignor to Sigma Industries, Inc., Menlo Park, Calif.
Filed Oct. 11, 1966, Ser. No. 585,785
U.S. Cl. 174—153
Int. Cl. H01b 17/26
3 Claims

ABSTRACT OF THE DISCLOSURE

An aperture seal is disclosed of two members connectable together on opposite sides of a closure at an aperture therein with the member on one side provided with a heat shrinkable sleeve with enclosed sealant for shrinking onto and sealing an electrical conductor extending therethrough and through the aperture and with a sealing member positioned between that member and the enclosure for sealing the conductor to the enclosure.

---

This invention relates to a heat shrinkable assembly for sealing an electrical conductor and, more particularly, to a threaded grommet for hermetically sealing an insulated electrical conductor or a wire through an aperture of a walled enclosure.

In conventional electrical wiring systems, it is often desirable to employ an airtight and watertight enclosure for housing junctions and other installations to prevent damage, corrosion or shorting of the conductors therein. Heretofore, it has been a common practice to employ an insulated stuffing box to insure that the relationship between an apertured enclosure and the conductor extending therethrough will remain airtight and watertight. However, such a stuffing box is not only cumbersome and difficult to adjust, but a large number of separate components are required to produce the desired tight fit.

Therefore, it is a principal object of this invention to provide a relatively simple means whereby a conductor can be hermetically disposed through the apertured wall of, for example, a conventional electrical conduit box or firewall.

It is a further object of this invention to provide a threaded grommet to releasably support and hermetically seal an electrical conductor upon an apertured wall surface.

It is another object of this invention to provide coupling means which can be quickly assembled and disassembled to secure or release an electrical conductor from its mounting through an aperture in an assembly wall.

It is a feature and advantage of this invention to provide an assembly for hermetically sealing an insulated conductor or wire through an apertured supporting surface which includes a two-piece threaded grommet, each member of which is of tubular configuration. The first tubular member includes external threads at one end and is externally flanged at the opposite end. The diameter of the threaded portion is selected so that the first member can be inserted into the aperture and abut against the apertured surface with its flanged end. The second member is further formed with an outside diameter greater than the diameter of the aperture to provide an airtight and watertight seal with the supporting surface around the aperture when the first member is threaded into the second member. The opposite end of the second member is provided with an integral sleeve capable of assuming an internal dimension which is substantially less than the conductor which is to be extended through the aperture. Thus, by inserting the conductor or wire into the sleeve and through the first and second tubular members and then reducing the internal diameter of the sleeve so that it conforms tightly with the outer diameter of the conductor, a hermetic seal is produced. The reduction in the internal diameter of the sleeve is accomplished by employing a heat shrinkable material for the sleeve portion of the second member. With this construction not only is the conductor sealed to the supporting surface but also the conductor is rigidly connected to the supporting surface. Also, no seal is required between the first and second members.

It is a further feature and advantage of this invention to provide a sealant within the sleeve of the second member which softens upon application of heat. As the sleeve shrinks upon the conductor, the sealant is forced to flow around the insulated surface and partially out through the contracting end of the sleeve, thereby forming a permanent mechanical seal with the conductor.

It is still a further feature and advantage of this invention to provide an O-ring for creating the seal between the second member and the supporting surface. This construction provides a structure which can be quickly assembled and which produces a good seal between the second member and supporting surface even if those two elements are of different materials or contain minor surface defects.

These objects, features and advantages of the invention will be better understood and others will become apparent when reference is made to the following disclosure, especially in view of the attached drawings wherein:

FIG. 1 is an exploded perspective view of one embodiment of the invention; and

FIG. 2 is a side elevational sectional view of the structure shown in FIG. 1.

Referring now to the drawing wherein similar characters of reference represent corresponding parts in each of the several views, there is shown a grommet A in accordance with the present invention for hermetically securing a conductor 10 through wall member 12, such as a firewall, conduit box and the like.

Grommet A includes a male tubular member 14 and a female tubular member 16. Male tubular member 14 of, for example, molded rigid plastic, is provided at one end with external threads 18 and at the other end with an outwardly projecting flange 20. Threads 18 are of such a diameter that member 14 can be freely inserted through aperture 22 into wall member 12, while flange 20 is of sufficient size to prevent passage of member 14 completely through the aforementioned aperture 22. Flange 20 is further provided with indentations 24 to assure a firm gripping surface when tightening member 14 into member 16.

Tubular member 16 is provided at one end with internal threads 26 disposed so as to cooperate with external threads 18 on tubular member 14. An O-ring 28, such as of rubber or neoprene and slidable over threads 18, is provided to ensure an air and watertight seal between member 16 and wall member 12 when members 14 and 16 are screwed together on opposite sides of and against wall member 12. Tubular member 16 is further provided with indentations 29 for assisting in gripping member 16 during tightening or loosening relative to member 14.

Member 16 further includes integral therewith at the opposite end from internal threads 16 a sleeve 30 defining an opening or passage 32 through which conductor 10 is inserted. Similar to member 14, tubular member 16 is preferably formed of a molded rigid plastic such as a thermally stabilized modified polyolefin. Sleeve 30 is modified so as to be shrinkable upon the application of heat. Any heat recoverable material having the property of elastic memory can be utilized to form sleeve 30.

When employing the assembly of this invention, a grommet is selected having a member 14 insertable within the aperture 22. The threaded end of member 14 is inserted from the inside through aperture 22. O-ring 28 is then positioned over threads 26 in close proximity to wall 12. Member 16 is threaded onto member 14 and tightened as desired. Conductor 10 is inserted through opening 32 in sleeve 30 and on through the passage formed by the internal overlap of members 14 and 16. Sleeve 30 is then heat shrunk, for example, with a conventional heat gun, to form a tight fitting mechanical hermetic seal with conductor 10.

As shown more clearly in FIG. 2, a sealant 34 characterized as a nonsetting, nonsagging sealant adhesive such as a semi-thermo plastic sealant, is coated on the inside surface of sleeve 30'. Upon application of heat, sealant 34 melts and the sleeve 30' shrinks onto the conductor 10, causing the sealant to flow out around conductor 10 to form a permanent mechanical seal when cooled.

The completed assembly A when tightly sealed as shown in cross section in FIG. 2 provides a supporting member which completely encloses, insulates and hermetically seals conductor 10 within the aperture 22 of wall 12. When it is desired to remove conductor 10, it is only necessary to unscrew the members 14 and 16. Then by employing a new tubular member (not shown) a second conductor (not shown) can be inserted through the aperture 22 in wall 12.

Since the heat shrinkable sleeve 30 will shrink onto many different sizes of cable, a single assembly A in accordance with the present invention can be used with different sized cable. This reduces the number of parts required and only one hole size need be punched in the conduit boxes or supporting surfaces. Also, this construction eliminates the possibility of "cold flow" of the cable.

The present invention is particularly well suited for underground residential electrical distribution systems. However, it is obviously useful and desirable in many other applications which will become apparent to one skilled in the art.

Although one embodiment of the invention has been particularly shown and described, it will be apparent that other adaptations and modifications can be made without departing from the true scope and spirit of the invention.

I claim:
1. An assembly for sealing an electrical conductor within an aperture in an enclosure, comprising: a first tubular member having an outwardly projecting flange and a neck portion adapted to be inserted through said aperture wherein said flange will abut said enclosure around said aperture; a second tubular member having greater external cross section than said aperture; a sleeve of heat shrinkable material integral with said second member and defining a passage adapted to receive said conductor; means contained radially inwardly of said sleeve between the inside surface of said sleeve and the outside surface of the conductor for sealing said conductor within said second member when said conductor is extended through said passage into said aperture in said enclosure; means for releasably interconnecting said first and second members to rigidly secure both members on opposite sides of said aperture; and second means positioned between said second tubular member and the enclosure for sealing said second member to said enclosure whereby said sleeve can be shrunk onto and sealed to said conductor with said sealing means and sealed to said enclosure with said second sealing means thereby to create a seal between said conductor and said enclosure.

2. An assembly as set forth in claim 1 wherein said releasable interconnecting means comprises external threads on said first member and internal threads on said second member.

3. An assembly for sealing an electrical conductor within an aperture through an enclosure, comprising a first member having a substantially circular portion larger in diameter than the aperture and adapted to abut one surface of the enclosure around the aperture; a second tubular member having a substantially circular portion larger in diameter than the aperture and constructed for positioning adjacent the other surface of the enclosure around the aperture, a sleeve of heat shrinkable material integral with said second member and defining a passage constructed to receive said conductor and to communicate with the aperture when said circular portion of said second member is positioned adjacent the enclosure around the aperture; a sealant coated on the inside surface of said sleeve for sealing said conductor within said second member when said conductor is extended through said passage into said aperture in the enclosure and said sleeve is heat shrunk in the direction of the conductor; said first and second members including means for extending through said aperture and releasably interconnecting said first and second members when the circular portions of said members are positioned around the apertures to rigidly secure both members on opposite sides of the enclosure; and an O-ring of a diameter for positioning between the circular portion of said second member and the enclosure for sealing said second member to the enclosure whereby said sleeve can be shrunk onto and sealed to the conductor with said sealant and sealed to said enclosure with said O-ring thereby to create a seal between said conductor and said enclosure.

References Cited
UNITED STATES PATENTS
2,459,370 1/1949 Ferguson et al.
3,243,211 3/1966 Wetmore.

FOREIGN PATENTS
19,108 1906 Great Britain.
48,348 7/1964 Poland.

LARAMIE E. ASKIN, *Primary Examiner.*

U.S. Cl. X.R.
285—161, 381, 423